United States Patent [19]

Berrios

[11] Patent Number: 4,743,220
[45] Date of Patent: May 10, 1988

[54] REVERSIBLE DRIVE

[76] Inventor: Joseph E. Berrios, 975 NW. 114th Ave., Coral Springs, Fla. 33065

[21] Appl. No.: 47,277

[22] Filed: May 8, 1987

[51] Int. Cl.$^4$ ............................................. F16H 11/00
[52] U.S. Cl. ........................................ 474/7; 56/11.2; 74/202
[58] Field of Search .......................... 474/7, 1; 74/202; 56/11.2

[56] References Cited

U.S. PATENT DOCUMENTS

| | | | |
|---|---|---|---|
| 2,200,574 | 5/1940 | Davis | 74/202 |
| 2,897,645 | 8/1959 | Veillette | 56/11.2 |
| 3,477,439 | 11/1969 | Hamouz et al. | 474/7 X |
| 4,322,934 | 4/1982 | Doi | 56/11.2 X |
| 4,470,243 | 9/1984 | Rayfield | 56/11.2 |

Primary Examiner—Stephen J. Novosad
Assistant Examiner—Thuy M. Bui
Attorney, Agent, or Firm—Oltman and Flynn

[57] ABSTRACT

A reversible drive having a flexible endless belt driven in one direction, a first pair of inside and outside pulleys drivingly engaged by the belt and respectively connected coaxially to an inside drive roller and an outside roller which are engageable alternately with the inside and outside of a first cylinder, and a second pair of inside and outside pulleys drivingly engaged by the belt and respectively connected coaxially to an inside drive roller and an outside drive roller which are engageable alternately with the inside and outside of a second cylinder. The cylinders drive corresponding rotary driven members, such as opposite ground-engaging wheels on a lawn mower.

6 Claims, 3 Drawing Sheets

REVERSIBLE DRIVE

SUMMARY OF THE INVENTION

This invention relates to a reversible drive, preferably for two separate rotary members, such as ground-engaging wheels of a self-propelled lawn mower.

In accordance with the present invention, a flexible endless belt-like member is driven in one direction from a prime mover, such as an electric motor or a gasoline engine. The belt-like member passes in succession around two driven pulleys, one on a drive roller outside a cylinder and the other on a drive roller inside the cylinder. The two drive rollers are mounted for driving engagement alternately with the cylinder, so that when the outside drive roller engages the outside of the cylinder it rotates the cylinder in one direction, and when the inside drive roller engages the inside of the cylinder it drives the cylinder in the opposite direction.

For driving two separate rotary members, such as ground wheels of a self-propelled lawn mower, the belt-like member drives two pairs of pulleys, one pair on the outside and inside drive rollers associated with a first cylinder driving one ground wheel, and the other pair on the outside and inside drive rollers associated with a second cylinder driving the other ground wheel. The two sets of drive rollers are independently adjustable to establish either a forward drive or a reverse drive to the corresponding ground wheel.

A principal object of this invention is to provide a novel reversible drive.

Another object of this invention is to provide a novel reversible drive for the ground wheels of a self-propelled lawn mower.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

The drive arrangement of the present invention is shown on a lawn mower. However, it is to be understood that it may have other uses than driving the ground-engaging wheels of a lawn mower.

Figure 1:
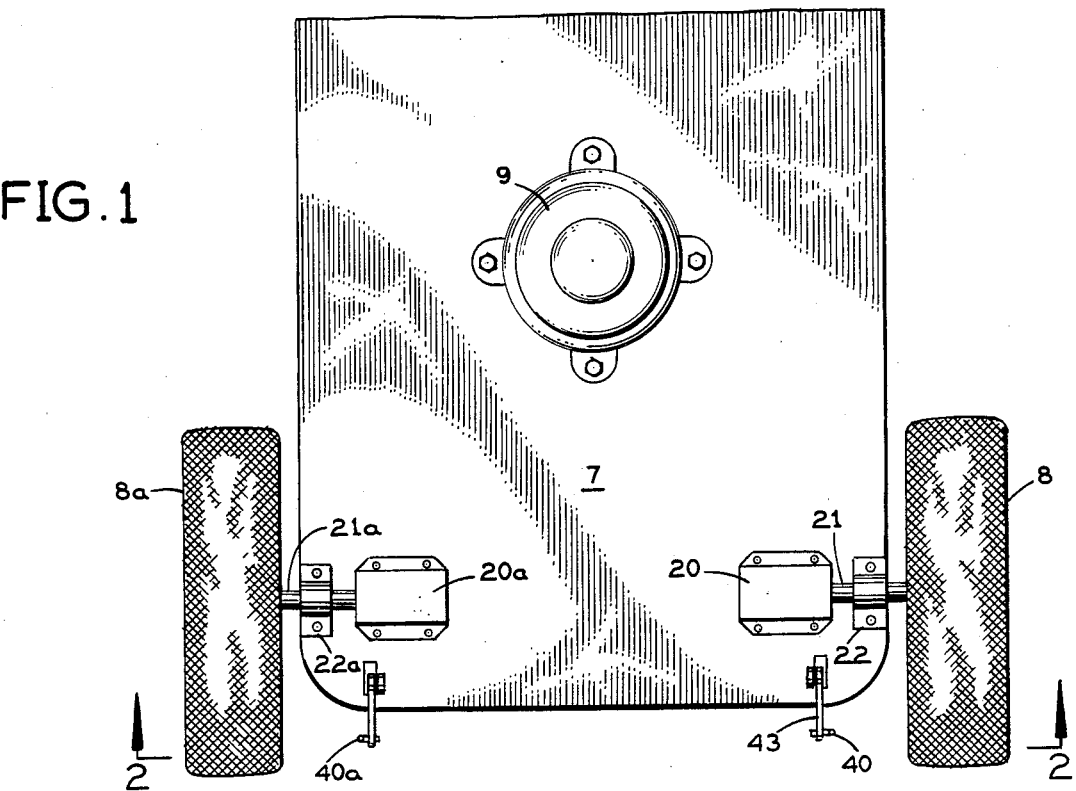
FIG. 1 is a top plan view of the wheeled base of a lawn mower equipped with the present reversible drive.
Figure 2:
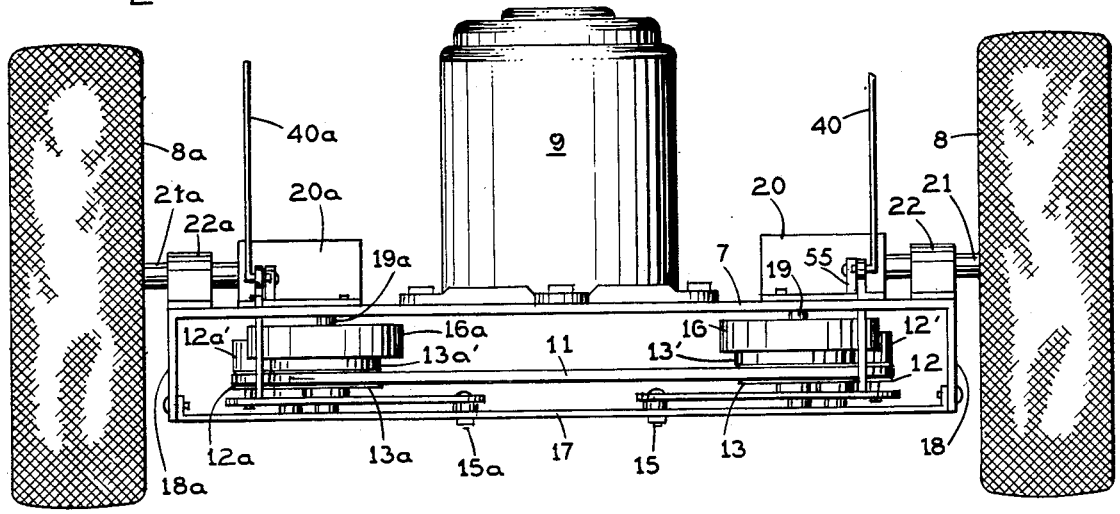
FIG. 2 is a front elevation of the apparatus shown in FIG. 1.
Figure 3:
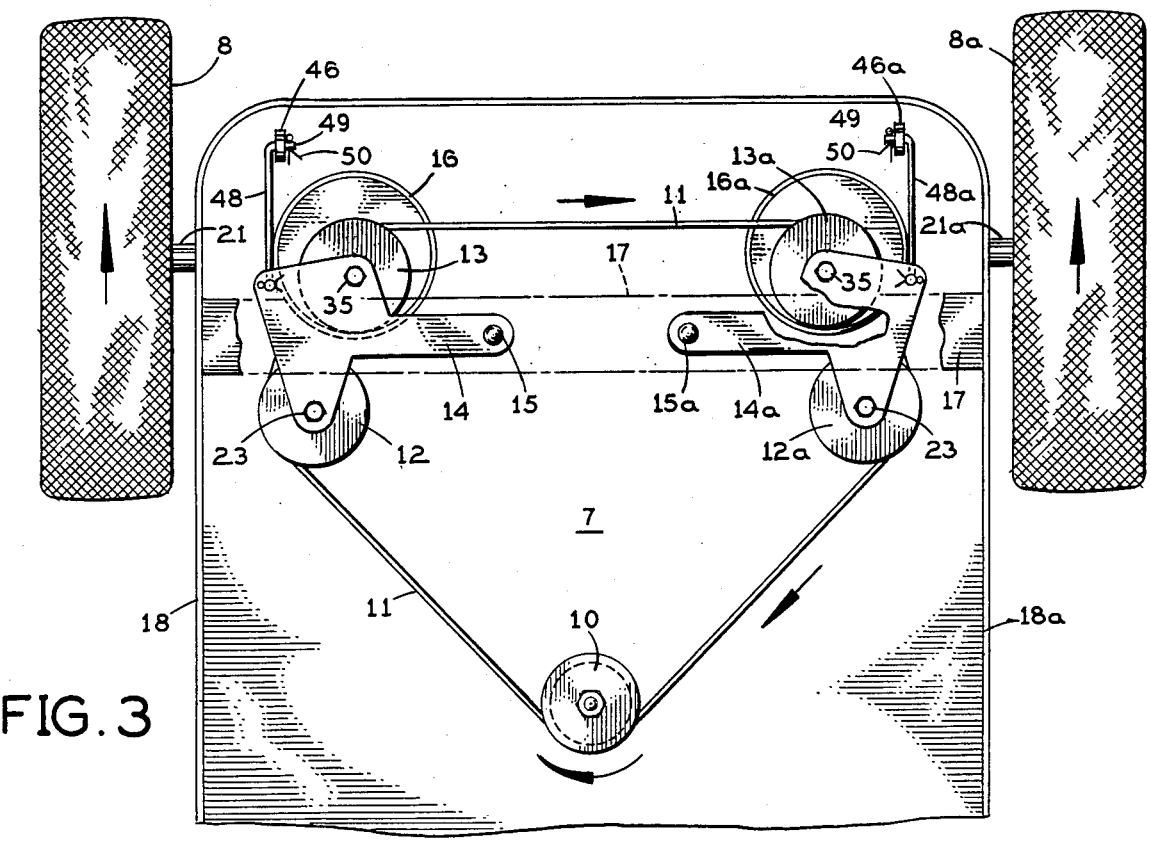
FIG. 3 is a bottom view of this apparatus with the drive in forward.
Figure 4:
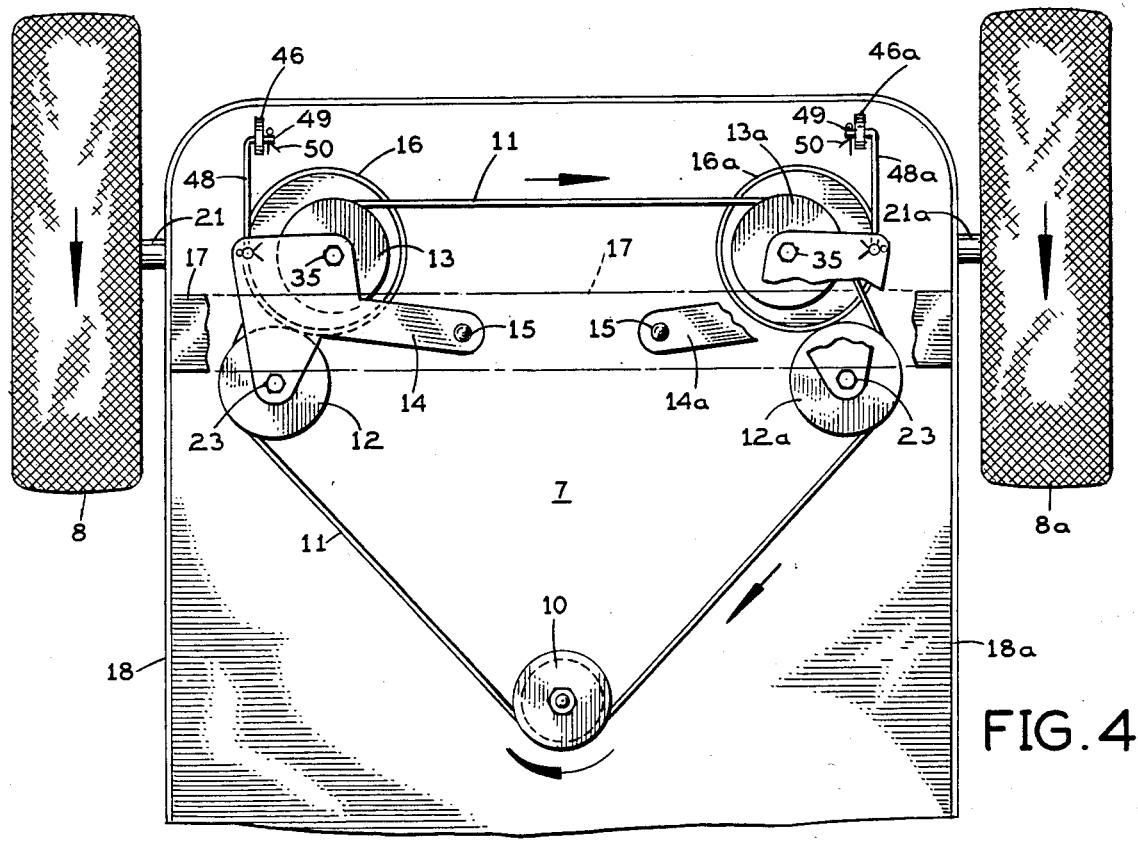
FIG. 4 is a similar view with the drive in reverse.

Referring to FIGS. 1 and 2, the mower has a generally horizontal deck 7 supported by two ground-engaging rear wheels 8 and 8a. On top of the deck is a prime mover 9, which may be either a small gasoline engine or an electric motor with a vertical output shaft below which carries a drive pulley 10 (FIGS. 3 and 4). The prime mover 9 rotates the drive pulley 10 in one rotational direction only.

The drive pulley 10 drivingly engages a flexible, endless, belt-like drive member 11, preferably a reinforced rubber belt of known design. Alternatively, the drive pulley may be replaced by a gear, in which case the endless, flexible, belt-like drive member 11 would be a chain. The drive pulley 10 drives belt 11 clockwise in FIGS. 3 and 4.

The belt-like drive member 11 drivingly engages in succession: a first outside pulley 12 attached (FIG. 2) below a first outside drive roller 12' with a cylindrical periphery; a first inside pulley 13 attached below a first inside drive roller 13'; a second inside pulley 13a attached beneath a second inside drive roller 13a'; and a second outside pulley 12a attached below a second outside drive roller 12a'. Each pulley 12, 13, 13a or 12a is concentric with and rotatable in unison with the corresponding roller 12', 13', 13a' or 12a'. The first outside drive roller 12' is located outside a first cylinder 16 and the first inside drive roller 13' is located inside this cylinder. The second inside drive roller 13a' is located inside a second cylinder 16a and the first outside drive roller 12a' is located outside this cylinder.

If desired, each cylinder 16 and 16a may have a V-groove on the inside and/or a V-groove on the outside and the corresponding drive rollers may have complementary V-shaped profiles to fit closely in the grooves.

The first pulleys 12 and 13 and drive rollers 12' and 13' are rotatably supported from below by a first plate-like horizontal support member 14 (FIG. 3) which is pivoted at 15 for adjustment between: (1) an extreme counter clockwise position (looking up - FIG. 3) in which the first inside drive roller 13' drivingly engages the inside of the first cylinder 16 and the first outside drive roller 12' is out of engagement with the outside of the first cylinder, and (2) an extreme clockwise position (looking up - FIG. 4) in which the inside roller 13' is disengaged from cylinder 16 and the outside roller 12' is in driving engagement with the outside of this cylinder.

Likewise, the second pulleys 12a and 13a and drive rollers 12a' and 13a' are rotatably supported from below by a second plate-like support member 14a which is pivoted at 15a for adjustment between: (1) an extreme clockwise position (looking up - FIG. 3) in which the second inside drive roller 13a' is in driving engagement with the inside of the second cylinder 16a and the second outside drive roller 12a' is away from engagement with the inside of this cylinder, and (2) an extreme counterclockwise position (looking up - FIG. 4) in which the outside roller 12a' drivingly engages the outside of cylinder 16a and the inside roller 13a' is out of engagement with that cylinder.

As shown in FIG. 2, the vertical pivot rods 15 and 15a are supported from below by a rigid horizontal strap or plate 17 which is bolted at its opposite ends to the depending vertical sides 18 and 18a of the mower deck 7.

The first cylinder 16 is concentrically attached to the lower end of a rotatable first vertical shaft 19 (FIG. 2). The upper end of this shaft is operatively connected to the input gear of a speed-reducing first gear reduction 20 of known design, which is mounted on top of the mower deck. The output gear of this gear reduction is connected to a laterally outwardly extending, horizontal, first axle 21 attached to the first ground-engaging wheel 8.

The second cylinder 16a is concentrically attached to the lower end of a rotatable second vertical shaft 19a. The upper end of this shaft is operatively connected to the input gear of a second gear reduction 20a having an output gear connected to a laterally outwardly extending, horizontal, second axle 21a attached to the second ground wheel 8a.

The wheel axles 21 and 21a are rotatably supported by respective anti-friction bearings 22 and 22a mounted on top of the mower deck.

Figure 5:
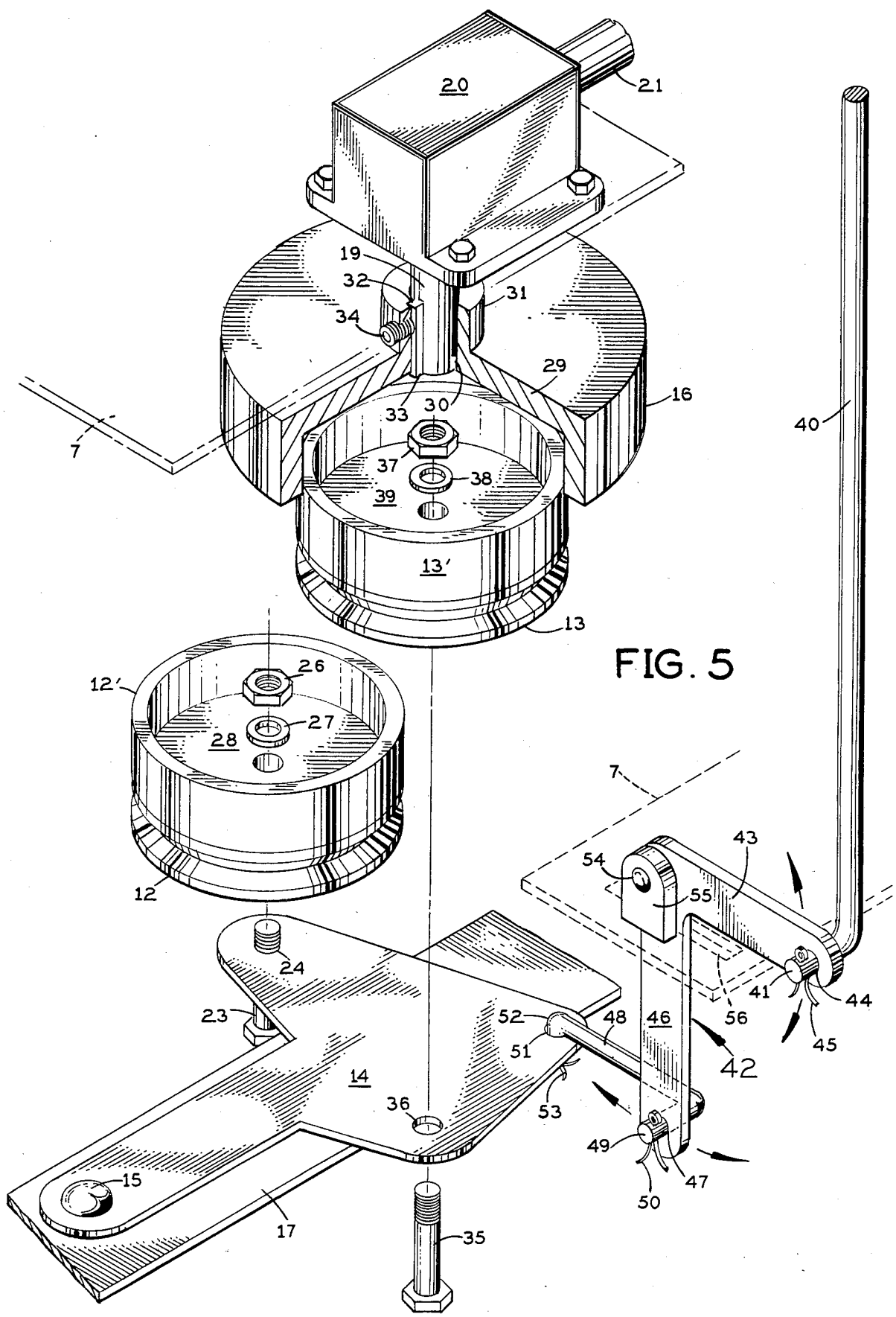
FIG. 5 is an exploded perspective view of the drive mechanism for one of the wheels.

FIG. 5 shows in detail the drive arrangement for wheel 8. The drive arrangement for the other wheel 8a is a mirror image of this.

The outside drive roller 12' and the pulley 12 just below it are rotatably supported by a vertical bolt 23, which extends up through an opening 24 in support plate 14 and through an anti-friction bearing at the center of pulley 12 and roller 12'. The screw-threaded upper end of bolt 23 is threadedly engaged by a nut 26, which holds a flat annular washer 27 down against the bottom wall 28 of roller 12'.

The cylinder 16 has a flat top wall 29 with a central opening 30 through which the shaft 19 extends down. Cylinder 16 has a cylindrical collar 31 extending up from its top wall 29 around the central opening 30. The top wall 29 and the collar 31 are formed with an internal vertical slot or keyway 32 of rectangular cross-section. Shaft 19 has a vertically elongated, outwardly projecting rib or key 33 which is snugly received in this keyway. A set screw 34 is threadedly received in collar 31 and its inner end engages the outside of key 33 on shaft 19. With this arrangement, shaft 19 and cylinder 16 are coupled to each other for rotation in unison.

The inside drive roller 13' and the pulley 13 just below it are rotatably supported by a vertical bolt 35, which extends up through an opening 36 in support plate 14 and through an anti-friction bearing at the center of pulley 13 and roller 13'. The screw-threaded upper end of bolt 35 is threadedly engaged by a nut 37, which holds a flat annular washer 38 down against the bottom wall 39 of roller 13'.

The pivoted support plate 14 for the outside and inside pulley-and-drive roller units 12—12' and 13—13' is operated through a mechanical linkage from a handle located at a suitable height on that side of the mower. As shown in FIG. 5, this linkage includes a vertically elongated rigid rod 40 extending down from that handle and having a short horizontal leg 41 on its lower end. A rigid coupling member 42 of inverted L-shape has a horizontal top leg 43 with a circular opening 44 near its back end which rotatably receives the horizontal bottom leg 41 of rod 40. A cotter pin 45 holds these parts assembled. Coupling member 42 has a vertical leg 46 extending down from the front end of its top leg 43 and formed with a circular opening 47 near its lower end. A bent horizontal rod 48 has a short rear leg 49 which is rotatably received in the opening 47 and is retained in it by a cotter pin 50. At its front end, rod 48 has a downwardly extending leg 51 which extends rotatably down through an opening 52 in the pivoted support plate 14. A cotter pin 53 holds this leg of the rod 48 assembled to support plate 14. Opening 52 is on the opposite side of both drive rollers 12 and 13 from the pivot 15 for support plate 14. Coupling member 42 is horizontally pivoted at 54 on a rigid support bracket 55 which, as shown in FIG. 2, extends up from the mower deck 7, shown in phantom in FIG. 5. The vertical leg 46 of coupling member 42 extends down through an elongated opening 56 in the mower deck which permits pivotal movement of coupling member 42.

With this arrangement, when vertical rod 40 is actuated to push rod 48 forward, it moves the support plate 14 on its pivot 15 to put the inside drive roller 13' in driving engagement with cylinder 16. Conversely, when vertical rod 40 is operated to pull rod 48 rearward, it pivots the support plate 14 in the opposite direction to put the outside drive roller 12' in driving engagement with cylinder 16.

The pivoted support plate 14a for the outside and inside pulley-and-drive roller units 12a—12a' and 13a—13a' for the other wheel 8a is operated by a mechanical linkage which is a mirror image of the one just described. Corresponding elements of this linkage which appear in FIGS. 1–4 have the same reference numerals plus an "a" suffix.

OPERATION

To drive both wheels 8 and 8a in the forward direction, both control handles are positioned in the "forward" position. This pivots the support plate 14 about its pivot 15 to its extreme counter-clockwise position and pivots support plate 14a on its pivot 15a to its extreme clockwise position in FIG. 3. The inside drive rollers 13' and 13a' engage the inside of the respective cylinders 16 and 16a. The drive belt 11, moving clockwise in FIG. 3, drives both inside pulleys 13 and 13a and the corresponding drive rollers 13' and 13a' clockwise in FIG. 3, and these drive rollers cause the respective cylinders 16 and 16a to rotate clockwise in FIG. 3, propelling the wheels 8 and 8a forward.

To drive both wheels 8 and 8a in the reverse direction, both control handles are to the "reverse" position. This pivots the support plate 14 on its pivot 15 to its extreme clockwise position in FIG. 4 and it pivots support plate 14a on its pivot 15a to its extreme counter-clockwise position, in FIG. 4. The outside drive rollers 12' and 12a' now engage the respective cylinders 16 and 16a on the outside. The drive belt 11, moving clockwise in FIG. 4, drives both outside pulleys 12 and 12a and the corresponding drive rollers 12' and 12a' clockwise in FIG. 4, and these drive rollers cause the respective cylinders 16 and 16a to rotate counterclockwise in FIG. 4, propelling the wheels 8 and 8a rearward.

To make a sharp right turn, the control handle for the left wheel 8a is set in its "forward" position and the control handle 41a for the right wheel 8 is set in its "reverse" position.

To make a sharp left turn the control handle 41 for the right wheel 8 is set in its "forward" position and the control handle 41a for the left wheel 8a is set in its "reverse" position.

I claim:

1. In a reversible drive having a prime mover with a rotary output shaft, the combination of:
   an endless flexible belt-like drive member driven in one direction by said prime mover;
   a rotary cylinder;
   an inside drive roller inside said cylinder and operatively connected to be driven by said belt-like drive member;
   an outside drive roller outside said cylinder and operatively connected to be driven by said belt-like drive member;
   and a shiftable support carrying said inside and outside drive rollers and selectively operable (a) to position said inside roller in driving engagement with the inside of said cylinder and to position said outside roller out of driving engagement with the outside of said cylinder, or (b) to position said inside roller out of driving engagement with the inside of said cylinder and to position said outside drive roller in driving engagement with the outside of said cylinder.

2. A reversible drive according to claim 1 wherein said belt-like member is a belt of rubber-like material, and further comprising:
a pulley drivingly engaged by said belt and coaxially fastened to said inside drive roller so that they rotate in unison;
and a pulley drivingly engaged by said belt and coaxially fastened to said outside drive roller so that they rotate in unison.

3. In a reversible drive for separate first and second rotary driven members, said drive having a prime mover with a rotary output shaft, the combination of:
an endless flexible belt-like drive member driven in one direction by said prime mover;
a first rotary cylinder operatively connected to said first rotary driven member to drive said first rotary driven member;
a first inside drive roller inside said first cylinder and operatively connected to be driven by said belt-like drive member;
a first outside drive roller outside said first cylinder and operatively connected to be driven by said belt-like drive member;
a first shiftable support carrying said first inside and outside drive rollers and selectively operable (a) to position said first inside roller in driving engagement with the inside of said first cylinder and to position said first outside roller out of driving engagement with the outside of said first cylinder, or (b) to position said first inside roller out of driving engagement with the inside of said first cylinder and to position said first outside roller in driving engagement with the outside of said first cylinder;
a second rotary cylinder operatively connected to said second rotary driven member to drive said second rotary driven member;
a second inside drive roller inside said second cylinder and operatively connected to be driven by said belt-like drive member;
a second outside drive roller outside said second cylinder and operatively connected to be driven by said belt-like drive member;
and a second shiftable support carrying said second inside and outside drive rollers and selectively operable (a) to position said second inside drive roller in driving engagement with the inside of said second cylinder and to position said second outside drive roller out of driving engagement with the outside of said second cylinder, or (b) to position said second inside drive roller out of driving engagement with the inside of said second cylinder and to position said second outside drive roller out of driving engagement with the outside of said second cylinder.

4. A reversible drive according to claim 3 wherein said belt-like member is a belt of rubber-like material, and further comprising a respective pulley operatively connected to each of said drive rollers and drivingly engaged by said belt.

5. In a reversible drive on a lawn mower having a prime mover with a rotary output shaft and laterally spaced first and second ground-engaging wheels, the combination of:
an endless flexible belt-like drive member driven in one direction by said prime mover;
a first rotary cylinder operatively connected to said first wheel to drive said first wheel;
a first inside drive roller inside said first cylinder and operatively connected to be driven by said belt-like drive member;
a first outside drive roller outside said first cylinder and operatively connected to be driven by said belt-like drive member;
a first shiftable support carrying said first inside and outside drive rollers and selectively operable (a) to position said first inside roller in driving engagement with the inside of said first cylinder and to position said first outside roller out of driving engagement with the outside of said first cylinder, or (b) to position said first inside roller out of driving engagement with the inside of said first cylinder and to position said first outside roller in driving engagement with the outside of said first cylinder;
a second rotary cylinder operatively connected to said second wheel to drive said second wheel;
a second inside drive roller inside said second cylinder and operatively connected to be driven by said belt-like drive member;
a second outside drive roller outside said second cylinder and operatively connected to be driven by said belt-like drive member;
and a second shiftable support carrying said second inside and outside drive rollers and selectively operable (a) to position said second inside drive roller in driving engagement with the inside of said second cylinder and to position said second outside drive roller out of driving engagement with the outside of said second cylinder, or (b) to position said second inside drive roller out of driving engagement with the inside of said second cylinder and to position said second outside drive roller out of driving engagement with the outside of said second cylinder.

6. A reversible drive according to claim 5 wherein said belt-like member is a belt of rubber-like material, and further comprising a respective pulley operatively connected to each of said drive rollers and drivingly engaged by said belt.

* * * * *